(12) United States Patent
Bergström et al.

(10) Patent No.: US 10,178,609 B2
(45) Date of Patent: Jan. 8, 2019

(54) SYSTEM AND METHOD TO SUPPORT INTER-WIRELESS LOCAL AREA NETWORK COMMUNICATION BY A RADIO ACCESS NETWORK

(71) Applicant: TELEFONAKTIEBOLAGET L M ERICSSON (PUBL), Stockholm (SE)

(72) Inventors: Mattias Tan Bergström, Stockholm (SE); Henrik Enbuske, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/691,089

(22) Filed: Aug. 30, 2017

(65) Prior Publication Data

US 2017/0367037 A1    Dec. 21, 2017

Related U.S. Application Data

(63) Continuation of application No. 14/728,463, filed on Jun. 2, 2015, now Pat. No. 9,769,737.
(Continued)

(51) Int. Cl.
*H04L 12/28* (2006.01)
*H04W 48/16* (2009.01)
(Continued)

(52) U.S. Cl.
CPC ......... *H04W 48/16* (2013.01); *H04L 41/0893* (2013.01); *H04W 48/00* (2013.01); *H04W 84/12* (2013.01)

(58) Field of Classification Search
CPC .......................... H04L 41/0893; H04W 84/12
See application file for complete search history.

(56) References Cited

U.S. PATENT DOCUMENTS

2006/0218271 A1* 9/2006 Kasslin ............... H04L 43/06
709/224
2011/0222523 A1* 9/2011 Fu ....................... H04W 36/22
370/338

(Continued)

FOREIGN PATENT DOCUMENTS

WO    2015003125 A2    1/2015
WO    2015020586 A1    2/2015

OTHER PUBLICATIONS

CMCC et al: "TP to update Annex" 3GPP Draft; R3-150274 TR 37870 Annex Update, 3rd Generation Partnership Project (3GPP), Mobile Competence Centre ; 650,Route Des Lucioles ; F-06921 Sophia-Antipolis Cedex ; France vol. RAN WG3, No. Athens, Greece; Feb. 9, 2015-Feb. 13, 2015 Feb. 8, 2015 (Feb. 8, 2015).

*Primary Examiner* — Chi H Pham
*Assistant Examiner* — Fahmida S Chowdhury (57) ABSTRACT

A system and method is provided for operating a user equipment ("UE") connected to a first wireless local access network ("WLAN") access point ("AP"). In one embodiment, the method includes receiving a first policy from a radio access network ("RAN") defining when to report a first difference between values for a first communication characteristic for communication with the first WLAN AP and a second WLAN AP, respectively, and searching for the second WLAN AP. The method also includes determining values for the first communication characteristic for communication with the first WLAN AP and the second WLAN AP, respectively, and reporting the first difference between values for the first communication characteristic for the first WLAN AP and the second WLAN AP to the RAN when the first difference crosses a first threshold in accordance with the first policy.

18 Claims, 5 Drawing Sheets

Related U.S. Application Data (60) Provisional application No. 62/145,886, filed on Apr. 10, 2015.

(51) Int. Cl.
*H04W 48/00* (2009.01)
*H04L 12/24* (2006.01)
*H04W 84/12* (2009.01)

(56) References Cited

U.S. PATENT DOCUMENTS

| | | | | |
|---|---|---|---|---|
| 2014/0079016 A1* | 3/2014 | Dai | ............... | H04L 5/0041 370/330 |
| 2014/0092886 A1* | 4/2014 | Gupta | ............... | H04W 4/70 370/338 |
| 2014/0094162 A1* | 4/2014 | Heo | ............... | H04W 4/70 455/422.1 |
| 2014/0204904 A1* | 7/2014 | Xiang | ............... | H04W 36/0066 370/331 |
| 2015/0016414 A1* | 1/2015 | Hwang | ............... | H04W 36/0055 370/331 |
| 2015/0029879 A1* | 1/2015 | Chou | ............... | H04W 4/70 370/252 |
| 2015/0092553 A1* | 4/2015 | Sirotkin | ............... | H04W 48/16 370/235 |
| 2015/0350988 A1* | 12/2015 | Himayat | ............... | H04W 36/22 370/331 |
| 2015/0373603 A1 | 12/2015 | Jung et al. | | |
| 2016/0044567 A1* | 2/2016 | Baghel | ............... | H04W 28/08 370/331 |
| 2016/0234726 A1* | 8/2016 | Nuggehalli | ............... | H04W 36/0022 |
| 2016/0302136 A1* | 10/2016 | Bergstrom | ............... | H04W 48/00 |

\* cited by examiner

SYSTEM AND METHOD TO SUPPORT INTER-WIRELESS LOCAL AREA NETWORK COMMUNICATION BY A RADIO ACCESS NETWORK

This application is a continuation of pending U.S. application Ser. No. 14/728,463, filed Jun. 2, 2015 which claims the benefit of U.S. Provisional Application No. 62/145,886, filed on Apr. 10, 2015, which is incorporated herein by reference.

TECHNICAL FIELD

The present invention is directed, in general, to communication systems and, more particularly, to a system and method that provisions a user equipment to report differences associated with values of communication characteristic(s) for communication with wireless local access network access points consistent with a policy from a radio access network.

BACKGROUND

In the Institute of Electrical and Electronics Engineers ("IEEE"), "Wi-Fi" (known generally as wireless local area networks ("WLANs"), which terms will be used interchangeably herein) is standardized in an IEEE 802.11 technical specification (IEEE Standard for Information Technology—Telecommunications and Information Exchange between Systems—Local and Metropolitan Area Networks—Specific requirements, Part 11: Wireless LAN Medium Access Control ("MAC") and Physical Layer ("PHY") Specifications), which is incorporated herein by reference. Wi-Fi is a technology that often operates on the 2.4 gigaHertz ("GHz") or the five GHz band. The IEEE 802.11 technical specification regulates a station (e.g., an access point or wireless terminal) physical layer, a media access control layer, and other aspects to secure compatibility and interoperability between access points and wireless terminals, (also referred to as user equipment "UE"). The terms "wireless terminal" and "UE" will be used interchangeably herein.

Wi-Fi generally operates in unlicensed bands and, as such, communication over Wi-Fi may be subject to interference sources from any number of known and unknown devices. Wi-Fi is commonly used as wireless extensions to fixed broadband access, for instance, in domestic environments and in hotspots like airports, train stations and restaurants.

Recently, Wi-Fi has been subject to increased interest from cellular network operators, not only as an extension to fixed broadband access. The interest is mainly about using Wi-Fi technology as an extension or alternative to cellular radio access network technologies to handle the continually increasing wireless bandwidth demands. Cellular operators that are currently serving mobile users with, e.g., any of the Third Generation Partnership Program ("3GPP") technologies such as Long Term Evolution ("LTE"), Universal Mobile Telecommunications System ("UMTS")/Wideband Code Division Multiple Access ("WCDMA") or Global System for Mobile Communications ("GSM"), see Wi-Fi as a wireless technology that can provide an extension of the cellular networks. The term "operator-controlled Wi-Fi" relates to a Wi-Fi deployment that on some level is integrated with a cellular network operator's existing network and where the 3GPP radio access networks and the Wi-Fi wireless access may even be connected to the same core network and provide the same communication services.

There is currently increased activity in the area of operator-controlled Wi-Fi in several standardization organizations. In the 3GPP organization, activities to connect Wi-Fi access points to the 3GPP-specified core network is being explored, and in the Wi-Fi Alliance ("WFA"), activities related to the certification of Wi-Fi products are being undertaken, which to some extent also is driven from the need to make Wi-Fi a viable wireless technology for cellular operators to support high bandwidth offerings in their networks. The term "Wi-Fi offload" refers to offloading traffic from the cellular networks in, for instance, peak-traffic-hours and in situations when the cellular network for one reason or another needs to be off-loaded to provide a requested quality of service, maximize bandwidth, or simply for coverage.

For a wireless operator, by offering a mix of two technologies that are standardized in isolation from each other comes the challenge of providing intelligent mechanisms for co-existence. One such area is connection management by a radio access network for a wireless terminal operating in the coverage of multiple WLAN access points.

The wireless terminals today usually support both Wi-Fi and a number of 3GPP cellular technologies, but many of the wireless terminals basically behave as two separate devices from a radio access perspective. The 3GPP radio access network and the modems and protocols that operate pursuant to the 3GPP specifications are basically unaware of the wireless access Wi-Fi protocols and modems that are operating pursuant to IEEE 802.11 technical specifications.

As noted hereinabove, up until now 3GPP and Wi-Fi have evolved as two separate communication systems and have been standardized to a great extend in isolation. However, 3GPP standards organizations and WFA have recently taken initiatives to improve interoperability of the two communication systems and provide mobile operators with greater control over their "operator-deployed" WLANs.

Despite these continued efforts, limitations of interoperability between a cellular radio access network and multiple, sometimes overlapping, wireless local access networks have now become substantial hindrances for efficient wide-scale deployment of mobile radio access technology. Accordingly, what is needed in the art is an approach that overcomes deficiencies in the current systems and methods.

SUMMARY OF THE INVENTION

These and other problems are generally solved or circumvented, and technical advantages are generally achieved, by advantageous embodiments of the present invention for a method of operating a user equipment ("UE") connected to a first wireless local access network ("WLAN") access point ("AP"). In one embodiment, the method includes receiving a first policy from a radio access network ("RAN") defining when to report a first difference between values for a first communication characteristic for communication with the first WLAN AP and a second WLAN AP, respectively, and searching for the second WLAN AP. The RAN employs a different radio access technology than the first WLAN AP and the second WLAN AP. The method also includes determining values for the first communication characteristic for communication with the first WLAN AP and the second WLAN AP, respectively, and reporting the first difference between values for the first communication characteristic for the first WLAN AP and the second WLAN AP to the RAN when the first difference crosses a first threshold in accordance with the first policy.

In another aspect, the present invention provides a method of operating a base station operable in a RAN in communication with a user equipment connected to a first WLAN AP. In one embodiment, the method includes providing a first policy defining when to report a first difference between values for a first communication characteristic for communication between the UE and the first WLAN AP and a second WLAN AP, respectively. The RAN employs a different radio access technology than the first WLAN AP and the second WLAN AP. The method also includes receiving a report indicating the first difference between values for the first communication characteristic for the first WLAN AP and the second WLAN AP when the first difference crosses a first threshold in accordance with the first policy.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules associated with steering traffic between two radio access technologies ("RATs") controlled by a radio access network.

A process for performing traffic steering for a user equipment among multiple RATs will be described with respect to exemplary embodiments in a specific context, namely, a system and method that controls a user equipment to report differences associated with a communication characteristic for a first WLAN AP and a second WLAN AP consistent with a policy provided by a radio access network (employing a different RAT than the first and second WLAN APs). While the principles will be described in the environment of a cellular communication network, any environment that may benefit from such a system and method that enables traffic steering for a user equipment among multiple RATs controllable by a radio access network is well within the broad scope of the present disclosure.

Figure 1:
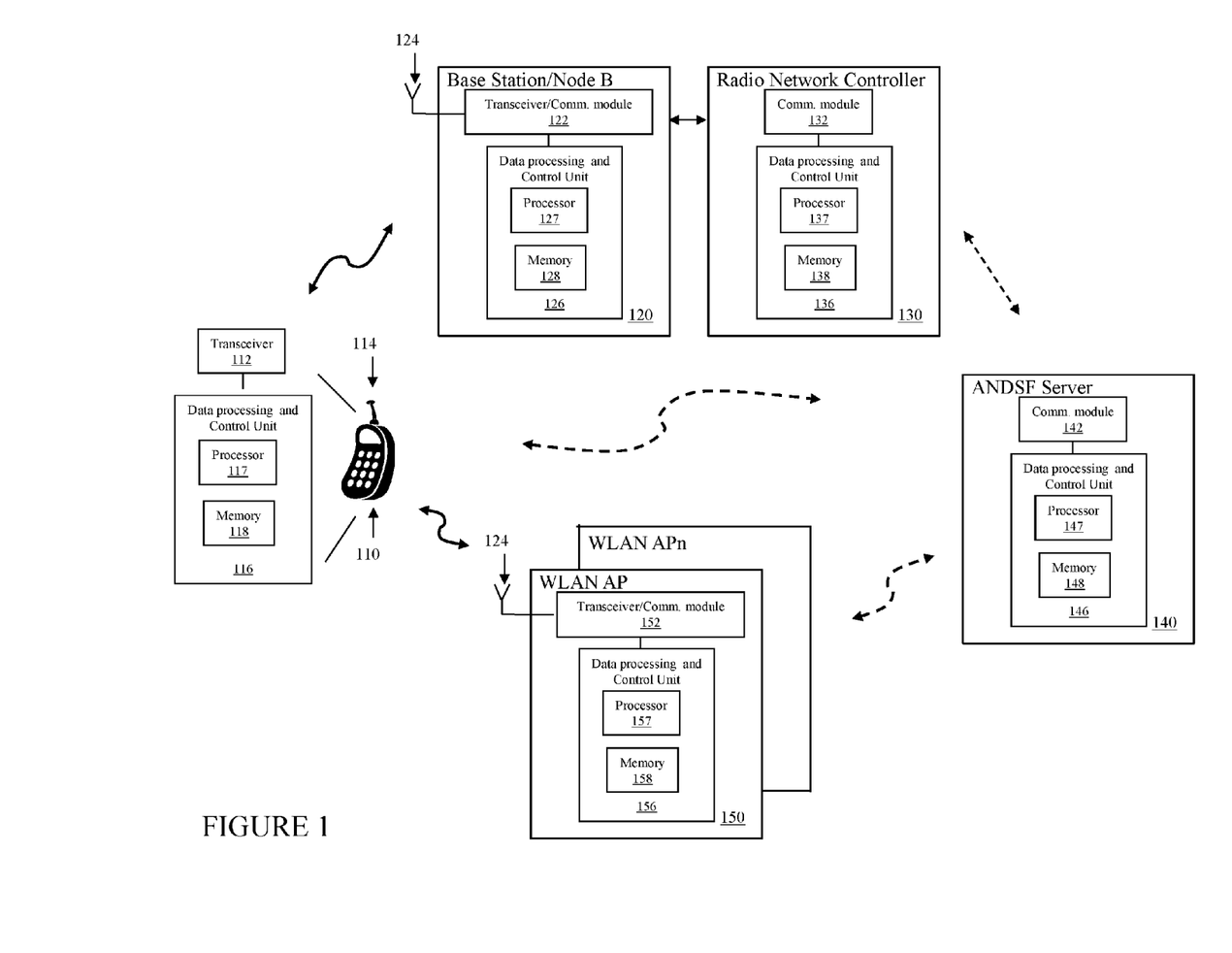
FIG. 1 illustrates a system level diagram illustrating an embodiment of a communication system including a system capable of performing traffic steering for a user equipment among multiple radio access technologies.

Turning now to FIG. 1, illustrated is a system level diagram of an embodiment of a communication system including a system capable of performing traffic steering for a user equipment 110 among multiple RATs. The communication system includes a cellular radio access network with a base station 120 coupled to a radio network controller 130 that communicates wirelessly and bidirectionally with the user equipment 110. While only a single user equipment 110 and base station 120 are illustrated in the communication system, it should be understood that multiple user equipment, base stations and other subsystems form the cellular radio access network. The communication system also includes a plurality of Wi-Fi access point/access controllers ("AP/AC") (also referred to as WLAN AP," one of which is designated WLAN AP 150) that provides Wi-Fi access for the user equipment 110. The communication system still further includes an access network discovery and selection function ("ANDSF") server 140 that assists the user equipment 110 with discovering RATs within the communication system. As illustrated, the user equipment 110 can access the ANDSF server 140 through multiple communication paths.

The user equipment 110 is formed with a transceiver 112 coupled to an antenna 114. Of course, multiple antennas can be employed to advantage. The user equipment 110 include a data processing and control unit 116 formed with a processor 117 coupled to a memory 118. Of course, the user equipment 110 may include other elements such as a keypad, a display, interface devices, etc. The user equipment 110 is generally a self-contained wireless communication device intended to be carried by an end user (e.g., subscriber stations, wireless terminals, mobile stations, machines, or the like).

The base station 120 is formed with a transceiver/communication module 122 coupled to an antenna 124. Of course, multiple antennas may be employed to advantage. Also, the transceiver/communication module 122 is configured for wireless and wired communication. The base station 120 may provide point-to-point and/or point-to-multipoint communication services. The base station 120 includes a data processing and control unit 126 formed with a processor 127 coupled to a memory 128. Of course, the base station 120 includes other elements such as interface devices, etc.

The base station 120 may host functions such as radio resource management. For instance, the base station 120 may perform functions such as Internet protocol ("IP") header compression and encryption of user data streams, ciphering of user data streams, radio bearer control, radio admission control, connection mobility control, dynamic allocation of communication resources to the user equipment 110 in both the uplink and the downlink, and measurement and reporting configuration for mobility and scheduling.

The radio network controller 130 and the ANDSF server 140 are each formed with communication modules 132, 142, respectively. The radio network controller 130 and the ANDSF server 140 also include data processing and control units 136, 146, respectively, formed with processors 137, 147, respectively, coupled to corresponding memories 138, 148. Of course, the radio network controller 130 and the ANDSF server 140 include other elements such as interface devices, etc. The radio network controller 130 generally provides access to a telecommunication network such as a public service telecommunications network ("PSTN") (not shown). Access may be provided using fiber optic, coaxial, twisted pair, microwave communications, or similar link coupled to an appropriate link-terminating element. The ANDSF server 140 can be hosted, without limitation, by a service provider that provides cloud computing over the World Wide Web and may be external to the communication systems of the service provider.

The WLAN AP 150 is formed with a transceiver/communication module 152 coupled to an antenna 154. Of course, multiple antennas may be employed to advantage. Also, the transceiver/communication module 152 is configured for wireless and wired communication. The WLAN AP 150 may provide point-to-point and/or point-to-multipoint communication services. The WLAN AP 150 includes a data processing and control unit 156 formed with a processor 157 coupled to a memory 158. Of course, the WLAN AP 150 includes other elements such as interface devices, etc. As mentioned above, the communication system includes a plurality of WLAN APs as designated by WLAN APn.

The data processing and control units identified above provide digital processing functions for controlling various operations required by the respective unit in which it operates, such as radio and data processing operations to conduct bidirectional communications between base stations, radio network controllers and access points, and a respective user equipment. The processors in the data processing and control units are each coupled to memory that stores programs and data of a temporary or more permanent nature.

The processors in the data processing and control units, which may be implemented with one or a plurality of processing devices, performs functions associated with its operation including, without limitation, precoding of antenna gain/phase parameters, encoding and decoding of individual bits forming a communication message, formatting of information and overall control of a respective communication element. Exemplary functions related to management of communication resources include, without limitation, hardware installation, traffic management, performance data analysis, configuration management, security, billing and the like. The processors in the data processing and control units may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories in the data processing and control units may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication element to perform its intended tasks. Of course, the memories may form a data buffer for data transmitted to and from the same. In the case of the user equipment, the memories may store applications (e.g., virus scan, browser, and games) for use by the same. Exemplary embodiments of the system, subsystems, and modules as described herein may be implemented, at least in part, by computer software executable by processors of the data processing and control units, or by hardware, or by combinations thereof.

The transceivers modulate information onto a carrier waveform for transmission by the respective communication element via the respective antenna(s) to another communication element. The respective transceiver demodulates information received via the antenna(s) for further processing by other communication elements. The transceiver is capable of supporting duplex operation for the respective communication element. The communication modules further facilitate the bidirectional transfer of information between communication elements.

An option for performing traffic steering for user equipment among multiple RATs can be described as follows. A first RAT (e.g., a 3GPP or other cellular RAT) controls the user equipment's connection to a second RAT (e.g., a WLAN) by sending traffic steering commands directing the user equipment to steer traffic to or from (or connect to) the second RAT. To send a traffic steering command, a connection is established between the user equipment and the first RAT. In other words, the user equipment is in a radio resource control ("RRC") CONNECTED mode in 3GPP LTE network, if the LTE network should send traffic steering commands.

In one arrangement to manage connectivity of the user equipment among a plurality of WLANs by a cellular radio access network, traffic steering for the user equipment in a RRC CONNECTED/cell dedicated channel ("CELL_DCH") state are controlled by the radio access network using dedicated traffic steering commands, potentially based also on WLAN measurements (as reported by the user equipment). Similar processes can be used for the user equipment in an IDLE mode and CELL_forward access channel ("FACH") states, CELL_paging channel ("PCH") states and UMTS Terrestrial Radio Access Network Registration Area ("URA")_PCH states. Alternatively, the user equipment in the RRC states can be configured to connect to a radio access network and wait for dedicated traffic steering commands. User preference can take precedence over RAN-based or ANDSF based rules (e.g., when a non-operator WLAN is preferred or a WLAN is off).

In such an arrangement, if the ANDSF is not present, the user equipment moves the traffic indicated in the steering command transmitted by the radio access network to the WLAN or 3GPP LTE network. When communications with multiple access networks are possible according to an ANDSF policy, the traffic steering commands can override the order of access network priorities. For instance, if for certain Internet protocol ("IP") traffic the ANDSF indicates a prioritized order of 3GPP access and WLAN access, upon reception of a command to steer traffic from 3GPP access to the WLAN, the user equipment can move the corresponding traffic to the WLAN. The dedicated traffic steering command may not override the ANDSF server in other cases, i.e., the user equipment would not consider an access network that is forbidden by the ANDSF server as being available based on the steering command. The user equipment would preferably not consider an access network that is restricted by the ANDSF server as being available based on the steering command. The processes described above can apply whether a home-ANDSF ("H-ANDSF") server or a visiting-ANDSF ("V-ANDSF") server policy is active.

As an example, traffic steering for user equipment in a RRC-CONNECTED/CELL_DCH includes:

Step 1. Measurement control: The base station (e.g., an evolved node ("eNB")) with a radio network controller ("RNC") configures the user equipment measurement procedures including the identity of a target WLAN to be measured.

Step 2. Measurement report: The user equipment is triggered to send a MEASUREMENT REPORT by the rules set by the measurement control.

Step 3. Traffic steering command: The eNB/RNC sends the steering command message to the user equipment to perform the traffic steering based on the reported measurements and loading in the radio access network.

It is noted that the above procedure does not take into account a user preference and/or a WLAN radio state. For example, based on user preferences and/or WLAN radio state, the user equipment may not be able to perform the configured measurement events. Additionally, the procedures should allow the user equipment to prioritize a non-operator WLAN over an operator WLAN. For example, the user equipment may disassociate from the operator WLAN and associate with a higher priority non-operator WLAN at any time during the measurement process.

It is further noted that the procedure described above and the following description can apply to a UMTS CELL_FACH as well. The procedure can also be extended to UMTS/LTE idle modes and UMTS CELL/URA_PCH states. For instance, the user equipment may be configured to report some indication (e.g., on available WLAN measurements) in a RRC up link ("UL") message, e.g., RRC connection request (from idle, in UMTS/LTE) or CELL UPDATE (in UMTS CELL/URA_PCH states). It is also noted that some of the steps above, e.g., steps 1 and 2, can be optional based on radio access network and user equipment configuration.

In a first step for the measurement control, the following examples are types of information that can be configured for a user equipment to measure the operator-identified WLAN:

1. Measurement events to trigger reporting as defined below in Table 1.
2. Target identification as defined below in Table 2.
3. Measurements to report by the user equipment as indicated below in Table 3.

Based on measurement events defined in 3GPP technical specifications TS 36.331 and TS 25.331, which are incorporated herein by reference, Table 1 below shows candidate measurement events for a WLAN.

TABLE 1

Candidate Measurement Events for a WLAN

| Event | Description |
|---|---|
| W1 | WLAN becomes better than a threshold (to trigger traffic steering to the WLAN) |
| W2 | WLAN becomes worse than a threshold (to trigger traffic steering from the WLAN) |
| W3 | 3GPP cell's radio quality becomes worse than a threshold1 and WLAN's radio quality becomes better than a threshold2 (to trigger traffic steering to the WLAN) |
| W4 | WLAN's radio quality becomes worse than the threshold1 and 3GPP cell's radio quality becomes better than threshold2 (to trigger traffic steering from the WLAN) |

It is noted that the thresholds in Table 1 are based on the values of the measurements to report as defined below in Table 3.

Target identification is used to indicate to the user equipment which WLAN to consider for the measurement control procedures including the target WLAN identifier ("ID") and the operating channels to search for. Table 2 below shows candidate target identifiers for a WLAN.

TABLE 2

Candidate Target Identifiers for WLAN

| Identifier | Description | Availability in WLAN |
|---|---|---|
| BSSID | Basic Service Set Identifier: for infrastructure BSS, the BSSID is the MAC address of the wireless access point | Beacon or probe response |
| SSID | Service Set Identifier: the SSID can be used in multiple, possibly overlapping BSSs | Beacon or probe response |
| HESSID | Homogeneous Extended Service Set Identifier: A MAC address whose value shall be configured by the hotspot operator with the same value as the BSSID of one of the APs in the network. All APs in the wireless network shall be configured with the same HESSID value. | Beacon or probe response (IEEE 802.11) |
| Domain Name List | Domain Name List element provides a list of one or more domain names of the entity operating the WLAN access network | Access Network Query Protocol ("ANQP") (Hot Spot ("HS") 2.0) |
| Operating class, channel number | Indication of the target WLAN frequency. Annex E of IEEE 802.11 provides definitions of the different operating classes | N/A |

It is noted that for steering traffic from a WLAN, i.e., events W2/W4, it may be sufficient that the serving WLAN reports a measurement below a threshold and the target identifiers are not needed.

In a second step for a measurement report, Table 3 below shows candidate measurements to report by the user equipment for a WLAN.

TABLE 3

Candidate measurement to report for WLAN

| Measurement | Description | Availability in WLAN |
|---|---|---|
| RCPI | Received to Channel Power Indicator: measurement of the received radio frequency ("RF") power in the selected channel for received frame in the range of −110 to 0 decibels ("dB") | Measurement |
| RSNI | Received Signal-to-Noise Indicator: an indication of the signal-to-noise plus interference ratio of a received IEEE 802.11 frame. Defined by the ratio of the received signal power (RCPI-ANPI) to the noise plus interference power (ANPI-average noise power indicator) in steps of 0.5 dB in the range from −10 dB to + 117 dB | Measurement |
| BSS load | Contains information on the current station population and traffic levels and the basic service set ("BSS"). | Beacon or probe response (technical specification 802.11k) |
| WAN metrics | Includes estimates of down link ("DL") and up link ("UL") speeds and loading as well as link status and whether the WLAN AP is at capacity. | ANQP (HS 2.0) |

In a third step for traffic steering, in order for a RAN to control traffic routing (if it is agreed to be supported) if ANDSF is not used, the RAN should know which access point names/bearers may be (or may not be) offloaded. The RAN would also inform the user equipment accordingly so that, e.g., the user equipment can issue the corresponding binding update with the core network ("CN") over an S2c interface. This would impact signaling between the CN and the base station ("eNB") as well as the user equipment behavior between access stratum ("AS") and non-access stratum ("NAS") levels.

Table 4 below shows candidate examples for identifying traffic to steer to or from a WLAN.

TABLE 4

Candidate examples for identifying the traffic to steer to or from WLAN

| Identifier | Description |
|---|---|
| DRB/RB-ID | Data radio bearer; identity of a radio bearer |
| QCI | QoS Class Identifier |

In some scenarios it may be beneficial for a first network to steer the user equipment between nodes of a second network, for example for an LTE eNB to steer the user equipment from one WLAN AP to another WLAN AP. This enables more radio access network control and hence may improve overall system performance since the radio access network has an overall outlook of the communication system loading, etc. to better determine which node should serve the user equipment. This can be compared, for example, to the case where each user equipment determines which node (e.g., which WLAN AP) to connect to (and/or steer traffic to). Each user equipment, however, only has local information and lacks overall system knowledge. The user equipment may take unfavorable mobility decisions, which degrades overall system performance.

For an LTE or other cellular network to control the mobility of the user equipment between WLAN APs, a beneficial metric is a radio signal characteristic associated with the user equipment (e.g., if the user equipment experiences a strong signal from one WLAN AP and a weak signal from another WLAN AP). Then, given that other communication characteristics are about the same, the user equipment may be able to achieve higher throughput, etc., if it is served by the WLAN AP with the stronger signal.

However, with pre-existing measurement events, the user equipment may provide too many reports (about the communication characteristics associated therewith) to the 3GPP or other cellular network, which consumes unnecessary radio resources, or too few reports to the 3GPP or other cellular network, which results in the 3GPP or other cellular network not having sufficient information. Hence, the 3GPP or other cellular network will not be able to provide an optimal mobility decision.

As introduced herein, a first network of a first RAT (e.g., an LTE or other cellular network) configures the user equipment to report the communication characteristics when it has determined that a network node of a second network of a second RAT (e.g., a WLAN AP to which it is not connected) is better than a network node of the second network to which it is connected. The user equipment reports provided herein will assist the first network to perform efficient mobility decisions for the user equipment to move among nodes in the second network, which uses a different RAT than the first network.

It is noted that when the user equipment is described as "connected" to a WLAN, it may include one or more of the following procedures:

1. IEEE 802.11 authentication: Authentication to the WLAN AP has been completed or is under way.
2. IEEE 802.1x Extensible Authentication Protocol ("EAP")-Subscriber Identity Module ("SIM") authentication: Authentication to the authentication, authorization, and accounting ("AAA") servers has been completed or is under way.
3. A four-way hand-shake between the user equipment and the WLAN network has been completed.
4. An Internet protocol ("IP") address has been assigned to the user equipment in the WLAN.
5. A packet data network ("PDN") connection has been established through the WLAN network, i.e., a connection between the user equipment and the PDN gateway.

6. Data traffic has been started through the WLAN network.

It can be appreciated that the user equipment reports to a 3GPP or other cellular network when the user equipment has determined and identified that a neighbor WLAN AP (i.e., an unconnected WLAN AP) has a better communication characteristic than a WLAN AP to which the user equipment is connected. In an embodiment, the radio access network configures the user equipment to report back to the radio access network when the user equipment has detected a value of a communication characteristic with a second WLAN AP (i.e., an unconnected WLAN AP) that is better than a value of the communication characteristic with a first WLAN AP (i.e., a connected WLAN AP). The first WLAN AP may be considered better than the second WLAN AP based on one or more criteria being fulfilled. Example criteria include, without limitation, a signal strength of the first WLAN AP is a threshold higher than that of the second WLAN AP, the signal quality of the first WLAN AP is a threshold higher than that of the second WLAN AP, the load (e.g., basic service set load) of the first WLAN AP is a threshold higher than that of the second WLAN AP, and/or a backhaul rate of the first WLAN AP is a threshold higher than that of the second WLAN AP. The thresholds above may be different when connecting to different WLAN APs. The user equipment may apply one threshold when being connected to a first WLAN AP and another threshold when being connected to a second WLAN AP.

The thresholds may also be different when considering different neighbor WLAN APs or unconnected WLAN APs. For example, if the user equipment is connected to a first WLAN AP and is evaluating whether a first neighbor WLAN AP (or first group of WLAN APs) is better than the first WLAN AP, then the user equipment can apply a first threshold. Conversely, if the user equipment is evaluating whether a second neighbor WLAN AP (or second group of WLAN APs) is better than the connected WLAN AP, then the user equipment can apply a second threshold. Such thresholds may be configured by the radio access network and may be signaled to the user equipment using radio resource control signaling.

In case the user equipment is not connected to any WLAN AP, the user equipment may consider the configured event suspended/inactive, etc., but may retain the event. A benefit of this approach is that the radio access network does not need to resend the event configuration to the user equipment each time the user equipment connects to a WLAN AP. Alternatively the user equipment may discard/remove the event when the user equipment disconnects from a WLAN AP or changes connectivity to a particular WLAN AP. The benefit of this approach is that control over the user equipment may be simpler to handle as the network may configure the event in the user equipment based on the current situation (e.g., consider the particular WLAN and/or 3GPP network state), and in that case it may not be suitable that the user equipment apply an event configuration provided for one WLAN AP when the user equipment is connected to another WLAN AP.

When the user equipment evaluates an event as introduced herein, the user equipment may only consider WLAN APs which fulfill one or more criteria. Example criteria include, without limitation, that the neighbor and connected WLAN APs have a common identifier, e.g., the same service set identifier ("SSID") and/or a same homogeneous extended service set identifier ("HESSID") and/or realm and/or public land mobile network ("PLMN"). Another criterion is that the neighbor WLAN AP has been identified by the network, e.g., the network has provided an identifier which is applicable to the WLAN AP. The neighbor WLAN AP may be on the same frequency channel and/or frequency band as the connected WLAN AP and/or the neighbor WLAN AP may be on a frequency that has been designated by the network (e.g., the network may only be interested in getting reports for WLAN APs which operate on a frequency indicated by the network).

A report transmitted by the user equipment may contain one or more of the following information, without limitation, a measured signal strength and/or quality of the neighbor WLAN AP, a measured signal strength and/or quality of the connected WLAN AP, a difference in signal strength and/or quality of the neighbor WLAN AP and the connected WLAN AP, a measured signal strength and/or quality of other WLAN APs (WLAN APs which may not fulfill the criteria), a difference in signal strength and/or quality of the other WLAN APs and the connected WLAN AP, and identifiers for the WLAN APs included in the report (e.g., SSIDs, BSSIDs, HESSIDs, etc.).

The user equipment may apply one or more criteria when evaluating whether or not it should send the report. Example criteria, without limitation, include a mobility mechanism, a network configuration, user equipment capabilities, the network capabilities and certain WLAN criteria. The mobility mechanism relates to when the user equipment has connected to a WLAN AP due to a certain mobility mechanism, or type of mobility mechanism. For example, the user equipment may only send the report in the case that the user equipment is connected to the WLAN AP due to a network controlled mobility mechanism. However, if the user equipment has connected to the WLAN AP due to, e.g., user preference, then the user equipment may not send any reports. The benefit of applying this condition is that if the user of the user equipment has triggered the user equipment to connect to the WLAN AP (e.g., user connected to its home WLAN AP) then the network may not be interested in receiving any reports from this user equipment. In such a case, the user equipment should probably remain connected to the user equipment selected WLAN AP and the network should not steer the user equipment away from the selected WLAN AP.

The network configuration constrains the user equipment from sending a report if the radio access network has configured the user equipment to do so. This ensures, for example, that the user equipment will not send reports which the radio access network is not going to use. With respect to the user equipment capabilities, not all of the user equipment is capable of reporting the information requested by the radio access network, either all the time or at certain times. For example, the user equipment may only be capable of sending the reports to certain types of networks (e.g., an LTE network but not in UTMS network) and hence the user equipment should not (or rather cannot in this example) send any reports if the user equipment is not capable communicating with a certain type of radio access network.

With respect to the network capabilities, the user equipment may only send the report if the network is capable of receiving the same. The user equipment may determine the network capabilities based on signaling from the network and/or based on whether the network has certain features enabled. The user equipment may determine whether a network has a feature enabled based on whether the network has configured the user equipment with parameters used in the feature.

The user equipment may also refrain from sending the reports if the WLAN AP to which the user equipment is connected fulfills one or more criteria. Example criteria include, without limitation, signal strength is above a threshold, signal quality is above a threshold, a load (e.g., basic service set load) is below a threshold, a backhaul rate is high, and/or a time duration that the user equipment has been connected to the connected WLAN AP is below a threshold.

Figure 2:
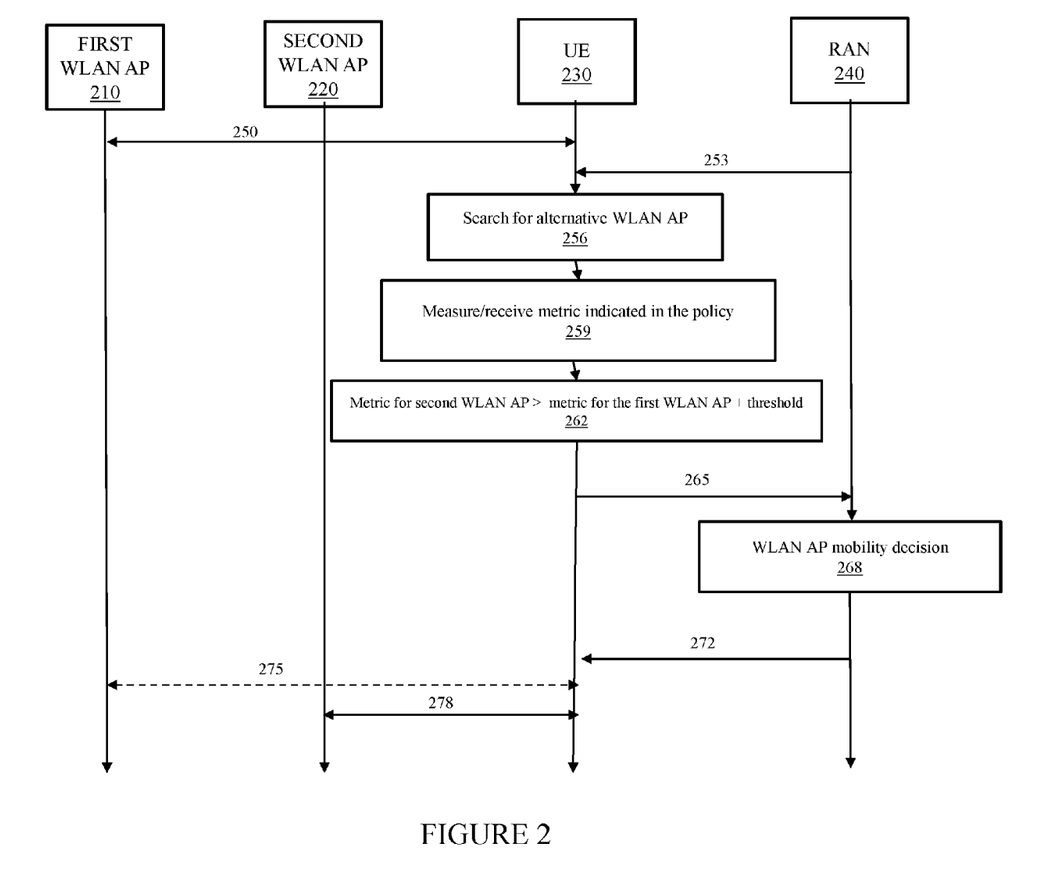
FIG. 2 illustrates a signaling diagram of an embodiment of a method of transitioning a user equipment from a first WLAN AP to a second WLAN AP.

Turning now to FIG. 2, illustrated is a signaling diagram of an embodiment of a method of transitioning a user equipment ("UE") 230 from a first WLAN AP 210 to a second WLAN AP 220. The user equipment 230 is initially connected to the first WLAN AP 210 demonstrated by a connection path 250. The user equipment 230 receives a policy (e.g., a measurement difference report criteria for a communication characteristic represented by a signal path 253) from a radio access network (e.g., a 3GPP RAN) 240. The user equipment 230 searches for an alternative WLAN AP such as the second WLAN AP 220 in a step or module designated 256. The user equipment 230 measures/receives a metric indicated in the policy (the measurement difference report criteria for the communication characteristic) for the connected WLAN AP (the first WLAN AP 210) and an alternative WLAN AP (the second WLAN AP 220) in a step or module designated 259.

The user equipment 230 determines in a step or module 262 if the metric for the second WLAN AP 220 is greater than the metric for the first WLAN AP 210 plus a threshold. The user equipment 230 transmits the measurement difference report criteria (represented by a signaling path 265) to the 3GPP RAN 240. In response, with the 3GPP RAN 240 makes a WLAN AP mobility decision in a step or module 268 by determining that the user equipment 230 should be steered from the first WLAN AP 210 to the second WLAN AP 220. The 3GPP RAN 240 then provides a command 272 to the user equipment 230 to connect to the second WLAN AP 220. The user equipment 230 then disconnects from the first WLAN AP 210 (indicated by disconnection path 275) and connects to the second WLAN 220 AP (indicated by connection path 278).

Figure 3:
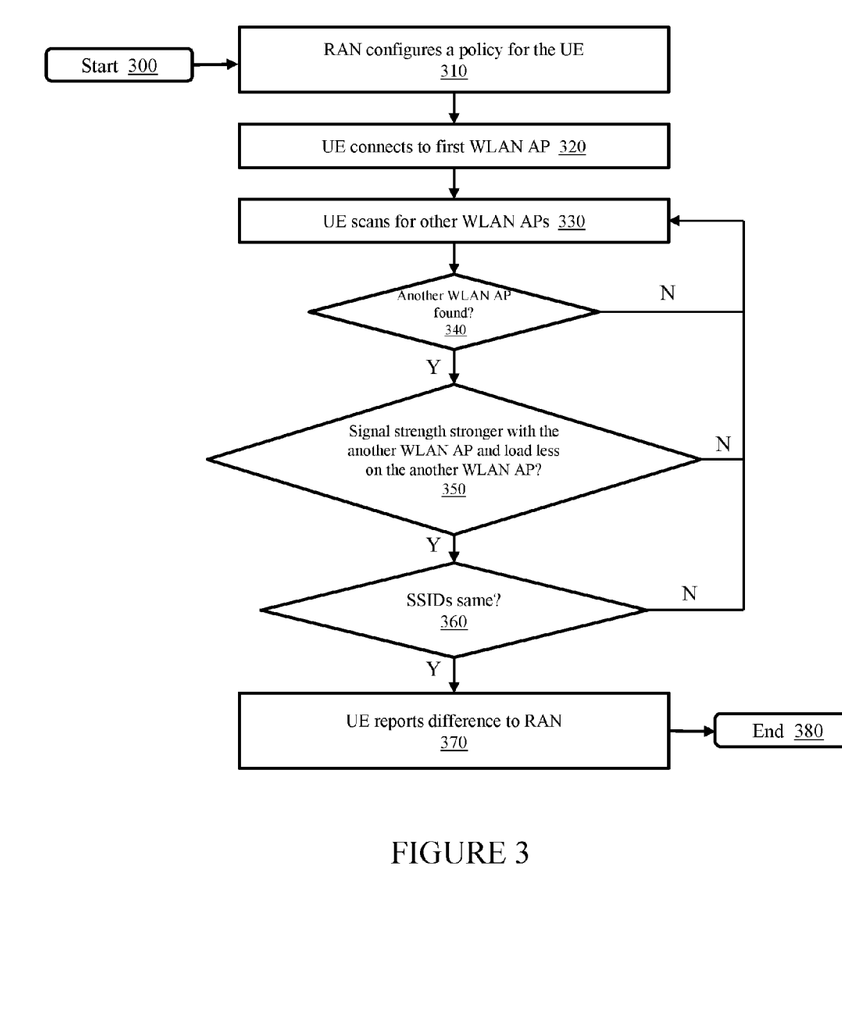
FIG. 3 illustrates a flow diagram of an embodiment of a radio access network configuring a policy for a user equipment to report a difference in a value of communication characteristic(s) between WLAN APs.

Turning now to FIG. 3, illustrated is a flow diagram of an embodiment of a radio access network configuring a policy for a user equipment ("UE") to report a difference in a value of communication characteristic(s) between WLAN APs. The method begins in a step or module 300. In a step or module 310, the radio access network ("RAN") configures a policy for a user equipment to report a difference in a value of signal strength above a threshold between a connected WLAN AP and other WLAN APs and a difference in a value of a load above a threshold (e.g., 10 percent lower) on the connected WLAN AP and other WLAN APs. The user equipment then connects to a first WLAN AP in a step or module 320. In a step or module 330, the user equipment scans for other WLAN APs. In a step or module 340, the user equipment determines if another WLAN AP has been found. If another WLAN AP has not been found, the method returns to the step or module 330. If another WLAN AP has been found, then in a step or module 350, the user equipment determines if a value of the signal strength of the another WLAN AP is stronger than the value of the signal strength of the first WLAN AP by the threshold and if the value of the load on the another WLAN AP is less than the value of the load on the first WLAN AP by the threshold. If the above criteria have not been met, the method returns to the step or module 330.

If the above criteria have been met, the user equipment determines if the another WLAN AP has the same service set identifier ("SSID") as the first WLAN AP in a step or module 360. If the SSIDs are not the same, the method returns to the step or module 330. If the SSIDs are the same, the user equipment reports the difference in values of the signal strength and load between the first WLAN AP and the another WLAN AP to the RAN in a step or module 370. The method then concludes in a step or module 380.

Figure 4:
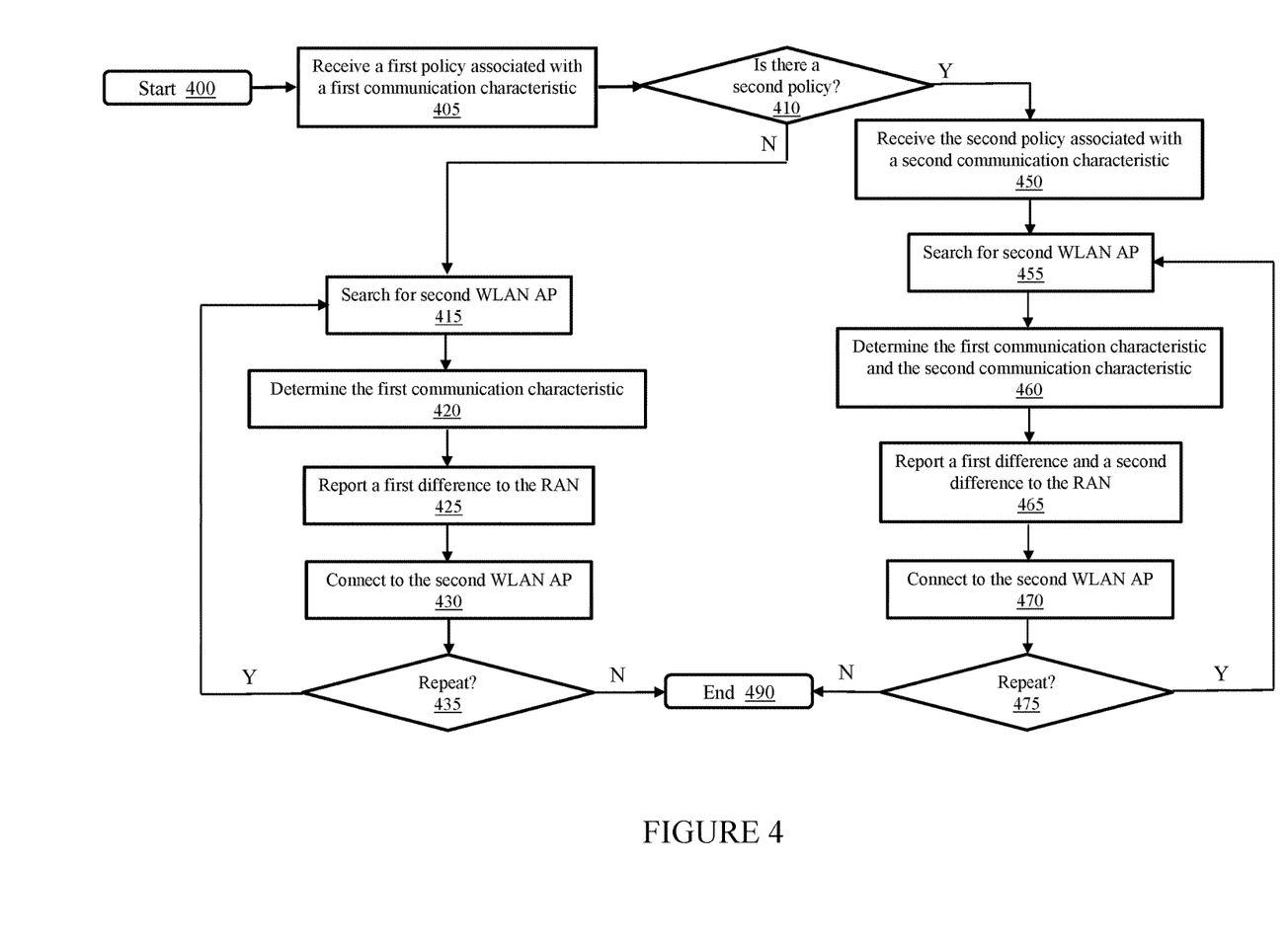
FIG. 4 illustrates a flow diagram of an embodiment of a method of operating a user equipment connected to a first WLAN AP.

Turning now to FIG. 4, illustrated is a flow diagram of an embodiment of a method of operating a user equipment ("UE") connected to a first WLAN AP. The method begins in a start step or module 400. At a step or module 405, the user equipment receives a first policy from a radio access network ("RAN") defining when to report a first difference between values for a first communication characteristic for communication with the first WLAN AP and a second WLAN AP, respectively. The RAN employs a different radio access technology than the first WLAN AP and the second WLAN AP. The first WLAN AP and the second WLAN AP may have a common identifier (e.g., a service set identifier ("SSID") or a homogeneous extended service set identifier ("HESSID")). At a decisional step or module 410, it is determined if there is a second policy associated with a second communication characteristic. The first policy and the second policy may be transmitted by the RAN to the user equipment in the same message or different messages. If there is a second policy, the method proceeds to a step or module 450, otherwise the method continues to a step or module 415.

At the step or module 415, the user equipment searches for a second WLAN AP. The user equipment then determines values for the first communication characteristic for communication with the first WLAN AP and the second WLAN AP, respectively, at a step or module 420. The user equipment may determine the values for the first communication characteristic by measuring values for the first communication characteristic for communication between the user equipment and the first WLAN AP and the second WLAN AP, respectively. The user equipment may also acquire the values for the first communication characteristic for communication between the user equipment and the first WLAN AP and the second WLAN AP, respectively, from a communication node. The determination of the values for the first communication characteristic may be limited to when the first WLAN AP and the second WLAN AP operate in a common frequency band.

The method then continues with a step or module 425 wherein the user equipment reports the first difference between the values for the first communication characteristic for the first WLAN AP and the second WLAN AP to the RAN when the first difference crosses a first threshold in accordance with the first policy. As an example, if the first communication characteristic is a load on the first WLAN AP and the second WLAN AP, and the load on the first WLAN AP is 90 percent of the available bandwidth and the load on the second WLAN AP is 50 percent of the available bandwidth, then it may be advantageous for the user equipment to transfer connectively to the second WLAN AP. Assuming that the first policy set the first threshold for the load at a ten percent difference, then the user equipment would report the first difference of 40 percent (90 percent load on the first WLAN AP minus the 50 percent load on the second WLAN AP) to the RAN.

The RAN and the user equipment can now use the new information about the first WLAN AP and the second WLAN AP to determine a strategy to improve the connectivity and operation of the user equipment in accordance therewith. At a step or module 430, the user equipment connects to the second WLAN AP in response to a command from the RAN after reporting the first difference. Of course, the RAN may determine that the user equipment should maintain connectivity with the first WLAN AP due to other factors such as a signal strength of communication between the user equipment and the first WLAN AP as opposed to communication between the user equipment and the second WLAN AP. The method then continues with a decisional step or module 435 to determine if the above-referenced steps should be repeated. If the above-referenced steps of the method should be repeated, then the method returns to the step or module 415, otherwise the method ends at a step or module 490.

Returning now to the step or module 450, the user equipment receives the second policy from the RAN defining when to report a second difference between values for a second communication characteristic for communication with the first WLAN AP and the second WLAN AP, respectively. The first communication characteristic and/or the second communication characteristic may include, without limitation, a quality of service of communication between the user equipment and the first WLAN AP and the second WLAN AP, a signal strength of communication between the user equipment and the first WLAN AP and the second WLAN AP, a load on the first WLAN AP and the second WLAN AP, or a backhaul rate associated with the first WLAN AP and the second WLAN AP. At a step or module 455, the user equipment searches for the second WLAN AP. The user equipment then determines values for the first communication characteristic and the second communication characteristic for communication with the first WLAN AP and the second WLAN AP, respectively, at a step or module 460. The user equipment may determine the values as described above with respect to the step or module 420.

The method then continues with a step or module 465 wherein the user equipment reports the first difference and the second difference between the values for the corresponding first communication characteristic and second communication characteristic for communication with the first WLAN AP and the second WLAN AP to the RAN when the first difference crosses the first threshold in accordance with the first policy and/or the second difference crosses the second threshold in accordance with the second policy. Thus, the RAN and user equipment can now take into account multiple communication characteristics in evaluating connectivity and operation of the user equipment in accordance with the WLAN APs. At a step or module 470, the user equipment connects to the second WLAN AP in response to a command from the RAN after reporting the first difference and/or the second difference. The method then continues with a decisional step or module 475 to determine if the above-referenced steps should be repeated. If the above-referenced steps of the method should be repeated, then the method returns to the step or module 455, otherwise the method ends at the step or module 490.

Figure 5:
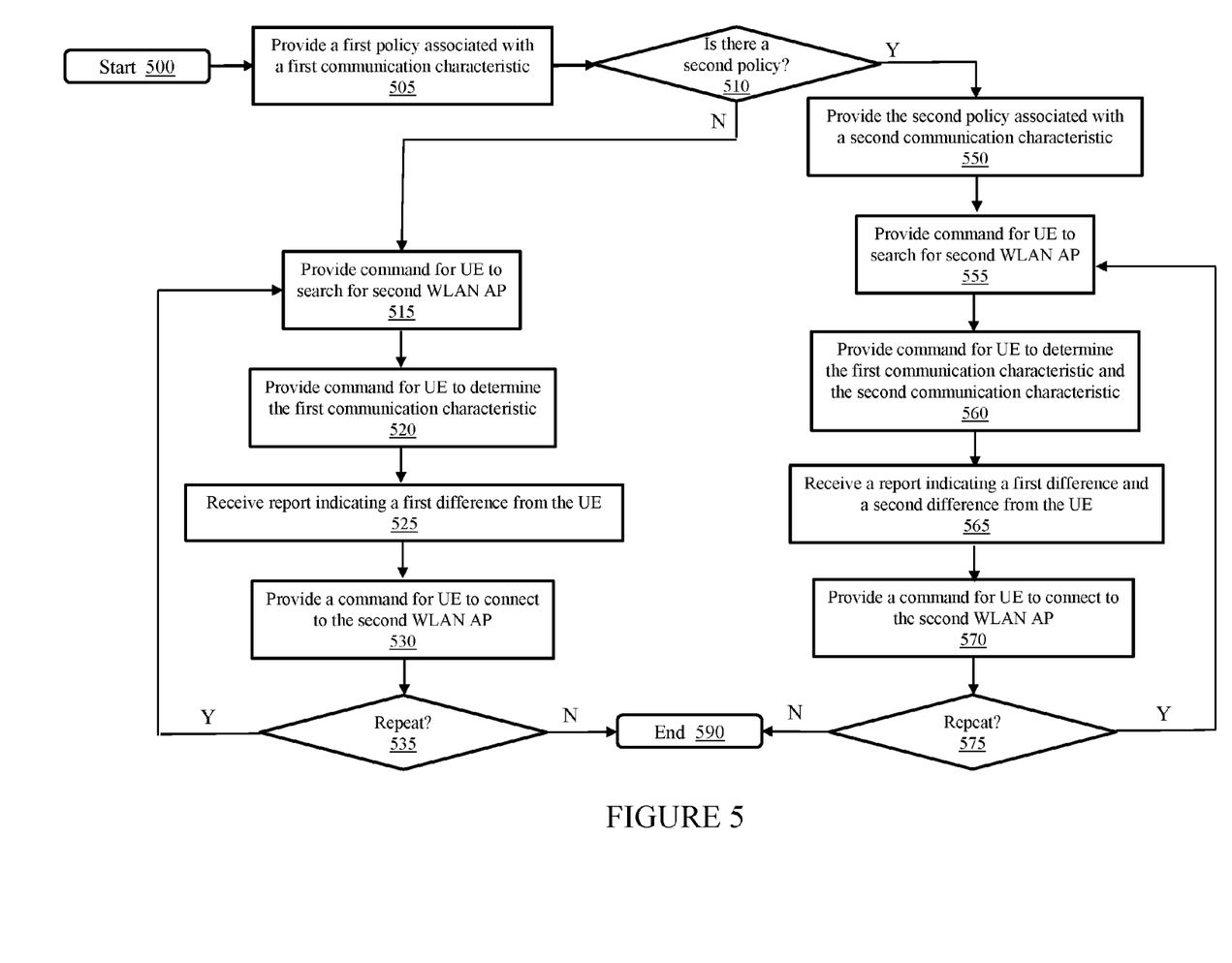
FIG. 5 illustrates a flow diagram of an embodiment of a method of operating a base station operable in a radio access network in communication with a user equipment connected to a first WLAN AP.

Turning now to FIG. 5, illustrated is a flow diagram of an embodiment of a method of operating a base station ("BS") operable in a RAN in communication with a user equipment ("UE") connected to a first WLAN AP. The method begins in a start step or module 500. At a step or module 405, the base station provides a first policy defining when to report a first difference between values for a first communication characteristic for communication between the user equipment and the first WLAN AP and a second WLAN AP, respectively. The RAN employs a different radio access technology than the first WLAN AP and the second WLAN AP. The first WLAN AP and the second WLAN AP may have a common identifier (e.g., a service set identifier ("SSID") or a homogeneous extended service set identifier ("HESSID")). At a decisional step or module 510, it is determined if there is a second policy associated with a second communication characteristic. The first policy and the second policy may be transmitted by the base station to the user equipment in the same message or different messages. If there is a second policy, the method proceeds to a step or module 550, otherwise the method continues to a step or module 515.

At the step or module 515, the base station provides a command to the user equipment to search for the second WLAN AP. The base station then provides a command to the user equipment to determine the values for the first communication characteristic for communication with the first WLAN AP and the second WLAN AP, respectively, at a step or module 520. The command to the user equipment to determine the values for the first communication characteristic may be limited to when the first WLAN AP and the second WLAN AP operate in a common frequency band.

The method then continues with a step or module 525 wherein the base station receives a report indicating the first difference between values for the first communication characteristic for the first WLAN AP and the second WLAN AP when the first difference crosses a first threshold in accordance with the first policy. As an example, if the first communication characteristic is a load on the first WLAN AP and the second WLAN AP, and the load on the first WLAN AP is 90 percent of the available bandwidth and the load on the second WLAN AP is 50 percent of the available bandwidth, then it may be advantageous for the user equipment to transfer connectively to the second WLAN AP. Assuming that the first policy set the first threshold for the load at a ten percent difference, then the base station would receive a report indicating the first difference of 40 percent (90 percent load on the first WLAN AP minus the 50 percent load on the second WLAN AP) from the user equipment.

The BS (in the RAN) and the user equipment can now use the new information about the first WLAN AP and the second WLAN AP to determine a strategy to improve the connectivity and operation of the user equipment in accordance therewith. At a step or module 530, the base station provides a command to the user equipment to connect to the second WLAN AP after receiving the report. Of course, the base station may determine that the user equipment should maintain connectivity with the first WLAN AP due to other factors such as a signal strength of communication between the user equipment and the first WLAN AP as opposed to communication between the user equipment and the second WLAN AP. The method then continues with a decisional step or module 535 to determine if the above-referenced steps should be repeated. If the above-referenced steps of the method should be repeated, then the method returns to the step or module 515, otherwise the method ends at a step or module 590.

Returning now to the step or module 550, the base station provides a second policy to the user equipment defining when to report a second difference between values for a second communication characteristic for communication between the user equipment and the first WLAN AP and the second WLAN AP, respectively. The first communication characteristic and/or the second communication characteristic may include, without limitation, a quality of service of communication between the user equipment and the first WLAN AP and the second WLAN AP, a signal strength of communication between the user equipment and the first WLAN AP and the second WLAN AP, a load on the first WLAN AP and the second WLAN AP, or a backhaul rate associated with the first WLAN AP and the second WLAN AP. At a step or module 555, the base station provides a command to the user equipment to search for the second WLAN AP. The base station then provides a command to the user equipment to determine values for the first communication characteristic and the second communication characteristic for communication with the first WLAN AP and the second WLAN AP, respectively, at a step or module 560.

The method then continues with a step or module 565 wherein the base station receives a report from the user equipment indicating the first difference and the second difference between the values for the corresponding first communication characteristic and second communication characteristic for communication with the first WLAN AP and the second WLAN AP when the first difference crosses the first threshold in accordance with the first policy and/or the second difference crosses the second threshold in accordance with the second policy. Thus, the base station (in the RAN) and user equipment can now take into account multiple communication characteristics in evaluating connectivity and operation of the user equipment in accordance with the WLAN APs. At a step or module 570, the base station provides a command to the user equipment to connect to the second WLAN AP after receiving the report. The method then continues with a decisional step or module 575 to determine if the above-referenced steps should be repeated. If the above-referenced steps of the method should be repeated, then the method returns to the step or module 555, otherwise the method ends at the step or module 590.

Thus, a system and method has been introduced that provisions a user equipment to report differences associated with values of communication characteristic(s) for communication with a first WLAN AP and a second WLAN AP (employing a first RAT) consistent with a policy from a RAN (employing a second RAT). As a result, the policy of the RAN that governs the reporting of the communications between the user equipment and the first WLAN AP and the second WLAN AP can take into account more comprehensive information in selecting the access point for the user equipment.

In one aspect and referring back to FIG. 1, an apparatus (e.g., user equipment 110) is connected to a first WLAN AP (e.g., the WLAN AP 150) and includes a processor (e.g., the processor 117 of the user equipment 110) and memory (e.g., memory 118 of the user equipment 110) including computer program code. The apparatus is configured to receive a first policy from a RAN (e.g., including the base station 120 and radio network controller 130) defining when to report a first difference between values for a first communication characteristic for communication with the first WLAN AP and a second WLAN AP (e.g., the WLAN AP designated WLAN APn), respectively. The RAN employs a different radio access technology than the first WLAN AP and the second WLAN AP. The first WLAN AP and the second WLAN AP may have a common identifier (e.g., a service set identifier ("SSID") or a homogeneous extended service set identifier ("HESSID")). The apparatus is also configured to search for the second WLAN AP, and determine values for the first communication characteristic for communication with the first WLAN AP and the second WLAN AP, respectively.

The apparatus may determine the values for the first communication characteristic by measuring values for the first communication characteristic for communication between the apparatus and the first WLAN AP and the second WLAN AP, respectively. The apparatus may also acquire the values for the first communication characteristic for communication between the apparatus and the first WLAN AP and the second WLAN AP, respectively, from a communication node (e.g., another WLAN AP, or another user equipment). The determination of the values for the first communication characteristic may be limited to when the first WLAN AP and the second WLAN AP operate in a common frequency band.

The apparatus is also configured to report the first difference between values for the first communication characteristic for the first WLAN AP and the second WLAN AP to the RAN when the first difference crosses a first threshold in accordance with the first policy. The RAN and the apparatus can now use the new information about the first WLAN AP and the second WLAN AP to determine a strategy to improve the connectivity and operation of the apparatus in accordance therewith. The apparatus is also configured to connect to the second WLAN AP in response to a command from the RAN after reporting the first difference. Of course, the RAN may determine that the apparatus should maintain connectivity with the first WLAN AP due to other factors.

The apparatus is also configured to receive a second policy from the RAN defining when to report a second difference between values for a second communication characteristic for communication with the first WLAN AP and the second WLAN AP, respectively. The first and second policies may be part of the same or different messages between the apparatus and the RAN. The first communication characteristic and/or the second communication characteristic may include, without limitation, a quality of service of communication between the apparatus and the first WLAN AP and the second WLAN AP, a signal strength of communication between the apparatus and the first WLAN AP and the second WLAN AP, a load on the first WLAN AP and the second WLAN AP, or a backhaul rate associated with the first WLAN AP and the second WLAN AP.

The apparatus is also configured to determine values for the second communication characteristic for communication with the first WLAN AP and the second WLAN AP, respectively. When there is a second policy, the apparatus is configured to report the second difference between values for the second communication characteristic for the first WLAN AP and the second WLAN AP to the RAN when the first difference crosses the first threshold in accordance with the first policy and/or the second difference crosses a second threshold in accordance with the second policy. In accordance therewith, the apparatus may connect to the second WLAN AP in response to a command from the RAN after reporting the first difference and/or the second difference.

In another aspect and referring back to FIG. 1, an apparatus (e.g., base station 120) is operable in a radio access network in communication with a user equipment ("UE," e.g., user equipment 110) connected to a first WLAN AP (e.g., the WLAN AP 150) and a processor (e.g., the processor 127 of the base station 120) and memory (e.g., memory 128 of the base station 120) including computer program code. The apparatus is configured to provide a first policy defining when to report a first difference between values for a first communication characteristic for communication between the user equipment and the first WLAN AP and a second WLAN AP (e.g., the WLAN AP designated WLAN APn), respectively. The RAN employs a different radio access technology than the first WLAN AP and the second WLAN AP. The first WLAN AP and the second WLAN AP may have a common identifier (e.g., a service set identifier ("SSID") or a homogeneous extended service set identifier ("HESSID")).

The apparatus is also configured to provide a command to the user equipment to search for the second WLAN AP and, thereafter, provide a command to the user equipment to determine the values for the first communication characteristic for communication with the first WLAN AP and the second WLAN AP, respectively. The command to the user equipment to determine the values for the first communication characteristic may be limited to when the first WLAN AP and the second WLAN AP operate in a common frequency band.

The apparatus is also configured to receive a report indicating the first difference between values for the first communication characteristic for the first WLAN AP and the second WLAN AP when the first difference crosses a first threshold in accordance with the first policy. The apparatus (in the RAN) and the user equipment can now use the new information about the first WLAN AP and the second WLAN AP to determine a strategy to improve the connectivity and operation of the user equipment in accordance therewith. The apparatus is also configured to provide a command to the user equipment to connect to the second WLAN AP after receiving the report. Of course, the apparatus may determine that the user equipment should maintain connectivity with the first WLAN AP due to other factors.

The apparatus is also configured to provide a second policy to the user equipment defining when to report a second difference between values for a second communication characteristic for communication between the user equipment and the first WLAN AP and the second WLAN AP, respectively. The first and second policies may be part of the same or different messages between the apparatus and the user equipment. The first communication characteristic and/or the second communication characteristic may include, without limitation, a quality of service of communication between the user equipment and the first WLAN AP and the second WLAN AP, a signal strength of communication between the user equipment and the first WLAN AP and the second WLAN AP, a load on the first WLAN AP and the second WLAN AP, or a backhaul rate associated with the first WLAN AP and the second WLAN AP.

The apparatus is also configured to receive a report from the user equipment indicating the first difference and the second difference between the values for the corresponding first communication characteristic and second communication characteristic for communication with the first WLAN AP and the second WLAN AP when the first difference crosses the first threshold in accordance with the first policy and/or the second difference crosses the second threshold in accordance with the second policy. Thus, the apparatus (in the RAN) and user equipment can now take into account multiple communication characteristics in evaluating connectivity and operation of the user equipment in accordance with the WLAN APs. The apparatus is also configured to provide a command to the user equipment to connect to the second WLAN AP after receiving the report.

Program or code segments making up the various embodiments may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A method of operating a user equipment (UE) connected to a first wireless local access network (WLAN) access point (AP), the method comprising:
receiving a policy from a radio access network (RAN) defining when to report a value for a first communication characteristic for communication with said first WLAN AP and a value for a second communication characteristic for communication with a second WLAN AP, respectively, said RAN employing a different radio access technology than said first WLAN AP and said second WLAN AP;
determining values for said first communication characteristic for communication with said first WLAN AP and said second communication characteristic for communication with said second WLAN AP, respectively; and
reporting said values when said first communication characteristic crosses a first threshold and when said second communication characteristic crosses a second threshold, in accordance with said policy.

2. The method as recited in claim 1, wherein said determining comprises measuring said values for said first communication characteristic for communication between said UE and said first WLAN AP and said second communication characteristic for communication between said UE and said second WLAN AP, respectively.

3. The method as recited in claim 1, wherein said determining comprises acquiring from a communication node said values for said first communication characteristic for communication between said UE and said first WLAN AP and said second communication characteristic for communication between said UE and said second WLAN AP, respectively.

4. The method as recited in claim 1, wherein said determining occurs when said first WLAN AP and said second WLAN AP operate in a common frequency band.

5. The method as recited in claim 1, further comprising connecting to said second WLAN AP in response to a command from said RAN after reporting said values.

6. A user equipment (UE) connected to a first wireless local access network (WLAN) access point (AP), the UE comprising:
   a processor; and
   memory including computer program code, said memory and said computer program code configured to, with said processor, cause said UE to perform at least the following:
      receive a policy from a radio access network (RAN) defining when to report a value for a first communication characteristic for communication with said first WLAN AP and a value for a second communication characteristic for communication with a second WLAN AP, respectively, said RAN employing a different radio access technology than said first WLAN AP and said second WLAN AP;
      determine values for said first communication characteristic for communication with said first WLAN AP and said second communication characteristic for communication with said second WLAN AP, respectively; and
      report said values when said first communication characteristic crosses a first threshold and when said second communication characteristic crosses a second threshold, in accordance with said policy.

7. The UE as recited in claim 6, wherein said memory and said computer program code are further configured to, with said processor, cause said apparatus to measure said values for said first communication characteristic for communication between said apparatus and said first WLAN AP and said second communication characteristic for communication between said UE and said second WLAN AP, respectively.

8. The UE as recited in claim 6, wherein said memory and said computer program code are further configured to, with said processor, cause said apparatus to acquire from a communication node said values for said first communication characteristic for communication between said apparatus and said first WLAN AP and said second communication characteristic for communication between said UE and said second WLAN AP, respectively.

9. The UE as recited in claim 6, wherein said memory and said computer program code are further configured to, with said processor, cause said apparatus to determine said first communication characteristic when said first WLAN AP and said second WLAN AP operate in a common frequency band.

10. The UE as recited in claim 6, wherein said memory and said computer program code are further configured to, with said processor, cause said apparatus to connect to said second WLAN AP in response to a command from said RAN after reporting said values.

11. A method of operating a base station operable in a radio access network in communication with a user equipment (UE) connected to a first wireless local access network (WLAN) access point (AP), the method comprising:
   providing a policy defining when to report a value for a first communication characteristic for communication between said user equipment and said first WLAN AP and a value for a second communication characteristic for communication with a second WLAN AP, respectively, said RAN employing a different radio access technology than said first WLAN AP and said second WLAN AP; and
   receiving a report indicating said values when said first communication characteristic crosses a first threshold and when said second communication characteristic crosses a second threshold, in accordance with said policy.

12. The method as recited in claim 11, further comprising providing a command to said user equipment to determine said value for said first communication characteristic for communication with said first WLAN AP and said value for said second communication characteristic for communication with said second WLAN AP, respectively.

13. The method as recited in claim 11, further comprising providing a command to said user equipment to determine said values for said first communication characteristic and said second communication characteristic when said first WLAN AP and said second WLAN AP operate in a common frequency band.

14. The method as recited in claim 11, further comprising providing a command to said user equipment to connect to said second WLAN AP after receiving said report.

15. A base station operable in a radio access network in communication with a user equipment (UE) connected to a first wireless local access network (WLAN) access point (AP), the base station comprising:
   a processor; and
   memory including computer program code, said memory and said computer program code configured to, with said processor, cause said apparatus to perform at least the following:
      provide a policy defining when to report a value for a first communication characteristic for communication between said user equipment and said first WLAN AP and a value for a second communication characteristic for communication with a second WLAN AP, respectively, said RAN employing a different radio access technology than said first WLAN AP and said second WLAN AP; and
      receive a report indicating said values when said first communication characteristic crosses a first threshold and when said second communication characteristic crosses a second threshold, in accordance with said policy.

16. The base station as recited in claim 15, wherein said memory and said computer program code are further configured to, with said processor, cause said apparatus to provide a command to said user equipment to determine said value for said first communication characteristic for communication with said first WLAN AP and said value for said second communication characteristic for communication with said second WLAN AP, respectively.

17. The base station as recited in claim 15, wherein said memory and said computer program code are further configured to, with said processor, cause said apparatus to provide a command to said user equipment to determine said values for said first communication characteristic and said second communication characteristic when said first WLAN AP and said second WLAN AP operate in a common frequency band.

18. The base station as recited in claim 15, wherein said memory and said computer program code are further configured to, with said processor, cause said apparatus to provide a command to said user equipment to connect to said second WLAN AP after receiving said report.

* * * * *